United States Patent
Arora et al.

(10) Patent No.: US 10,002,497 B2
(45) Date of Patent: Jun. 19, 2018

(54) METHODS AND APPARATUS FOR REDEEMING AN ENTITLEMENT

(71) Applicant: MasterCard International Incorporated, Purchase, NY (US)

(72) Inventors: Hemant Arora, Haryana (IN);
Gurpreet Atwal, Somers, NY (US);
Jaipal Singh Kumawat, Rajasthan (IN)

(73) Assignee: Mastercard International Incorporated, Purchase, NY (US)

( * ) Notice: Subject to any disclaimer, the term of this patent is extended or adjusted under 35 U.S.C. 154(b) by 127 days.

(21) Appl. No.: 15/378,395

(22) Filed: Dec. 14, 2016

(65) Prior Publication Data

US 2017/0178462 A1    Jun. 22, 2017

(30) Foreign Application Priority Data

Dec. 17, 2015  (SG) .......................... 10201510398X (51) Int. Cl.
*G07F 19/00*  (2006.01)
*G06Q 20/10*  (2012.01)

(52) U.S. Cl.
CPC ....... *G07F 19/203* (2013.01); *G06Q 20/1085* (2013.01); *G07F 19/202* (2013.01)

(58) Field of Classification Search
CPC .................. G06Q 20/1085; G07F 19/203
USPC ........................................................ 235/379
See application file for complete search history.

(56) References Cited

U.S. PATENT DOCUMENTS

| | | | |
|---|---|---|---|
| 2009/0287562 A1 | 11/2009 | Bosch et al. | |
| 2012/0041812 A1* | 2/2012 | Postrel | G06Q 20/102 705/14.27 |
| 2012/0330832 A1* | 12/2012 | Aidasani | G06Q 20/3223 705/44 |
| 2016/0343023 A1* | 11/2016 | Sorem | G06Q 30/0231 |

FOREIGN PATENT DOCUMENTS

| | | |
|---|---|---|
| CN | 2002-329149 A | 11/2002 |
| CN | 2003-281383 A | 10/2003 |
| CN | 2005-157707 A | 6/2005 |

OTHER PUBLICATIONS

"PCT Notification of Transmittal of the International Search Report and Written Opinion", International Searching Authority, dated Mar. 14, 2017 (dated Mar. 14, 2017), for Application No. PCT/USS2016/065055, 8pgs.

* cited by examiner

*Primary Examiner* — Toan Ly
(74) *Attorney, Agent, or Firm* — Buckley, Maschoff & Talwalkar LLC (57) ABSTRACT

Disclosed is a machine for redeeming an entitlement that includes an interface for receiving user data including payment vehicle data. In an embodiment, a payment vehicle reader reads payment vehicle data from a payment vehicle, and an input device receives an input of at least one additional identifier. The machine also includes a communication module in communication with a processor. The processor receives account data associated with the user, wherein the account data includes one or more entitlements representing an award. The interface is configured to receive a selection of at least one entitlement, and the machine also includes a cash dispensing device for dispensing cash when a selected entitlement is an amount of cash.

7 Claims, 5 Drawing Sheets

METHODS AND APPARATUS FOR REDEEMING AN ENTITLEMENT

CROSS-REFERENCE TO RELATED APPLICATION

This application is a U.S. National Stage filing under 35 U.S.C. § 119, based on and claiming benefit of and priority to SG Patent Application No. 10201510398X filed Dec. 17, 2015.

TECHNICAL FIELD

The present invention relates to machines for dispensing cash.

BACKGROUND

There are many loyalty programs in operation today, that allow users to accumulate rewards points and other loyalty entitlements. The ways in which particular programs operate is complex and members of such programs are often unaware of the loyalty entitlements to which they are entitled.

Loyalty entitlements can include items such as goods or services purchasable using rewards points accumulated under a loyalty program, fee waivers for credit cards, cash redemption and so forth. Even for those consumers who are aware of their membership in a particular program, it can be difficult to ascertain their current loyalty entitlements. This is particularly the case for people who are unfamiliar or uncomfortable with using computer interfaces.

It is desirable that a user-friendly mechanism be provided by which users can understand their loyalty entitlements and redeem those entitlements.

SUMMARY

The present invention provides a machine for dispensing cash, comprising:
- an interface for receiving user data, the user data comprising payment vehicle data, the interface comprising:
  - a payment vehicle reader for reading the payment vehicle data from a payment vehicle of a user; and
  - an input device for receiving an input of at least one additional identifier, the user data comprising the at least one additional identifier if the at least one additional identifier is inputted;
- a communication module in communication with a processor, for sending the user data to the processor and receiving, from the processor, account data of an account associated with the user, the account being identifiable using the user data, the account data comprising one or more entitlements, each entitlement representing an award to which the user is entitled, wherein the interface is configured to receive a selection of at least one entitlement of the one or more entitlements; and
- a cash dispensing device for dispensing cash in the event that the selection of at least one entitlement comprises a selection of an amount of cash.

The present invention further provides a method for redeeming an entitlement for cash at an automatic teller machine (ATM), the method comprising:
- reading payment vehicle data from a payment vehicle using a payment vehicle reader of the ATM;
- sending the payment vehicle data to a processor of a value-added services server system;
- identifying, using the payment vehicle data, account data of a user account stored in the value-added services server system, the account data comprising one or more entitlements, each entitlement representing an award to which the user is entitled and wherein at least one entitlement comprises entitlement to an amount of cash;
- receiving a selection of the amount of cash through an interface of the ATM; and
- dispensing the amount of cash from a dispensing device of the ATM.

The present invention further provides a network comprising:
- at least one server system of a banking corporation;
- at least one value-added services server system; and
- at least one automatic teller machine (ATM) in electronic communication either or both of the at least one server system of a banking corporation and the at least one value-added services server system, the ATM being configured to:
  - authenticate a user with reference to user data held by the at least one server system of the banking corporation;
  - provide information to the at least one value-added services server system;
  - receive, from the at least one value-added services server system, account data of a user account held in the at least one value-added services server system, the account data comprising one or more entitlements to which the user is entitled; and
- dispense an amount of cash in response to selection of an entitlement of the one or more entitlements.

The term "payment vehicle" includes a credit card, debit card or other physical identifier carried by a person. Such a physical identifier may also be part of the person, such as a thumbprint, or facial features in the case of use of facial recognition technology.

The term "automatic teller machine", or "ATM", includes within its scope all relevant machines capable of dispensing cash such as, but not limited to, an automated teller machine, automated banking machine, cash machine, cashpoint, cashline, minibank, bankomat and devices colloquially referred to as the "hole in the wall".

The term "entitlements" refers to awards, such as rewards points or loyalty points accumulated through a rewards program (e.g. where points are earned for expenses at particular merchants or on particular payment vehicles), and similarly to program membership awards which may be accumulated or to which a user may become entitled upon, for example, registration to a program or for a payment vehicle (i.e. a sign-up bonus) and other value-added services. The term "entitlements" also refers to one or more items or cash for which the awards may be redeemed either in full, or with part payment—e.g. an item may be purchasable for 60,000 reward points or, alternatively, 45,000 reward points plus $20.

User accounts held in the rewards system are maintained in a value-added services server system. That server system may be maintained by a bank or other financial institution, a dedicated entitlements program manager or any other relevant third party. Such user accounts may comprise a user bank account. However, unless context dictates or permits otherwise, the term "user account" as used herein shall refer to a user account held in the rewards points system and a user's banking account shall be referred to as a "user bank account".

The term "user data" refers to all data related to a data. User data therefore includes, but is not limited to, payment vehicle data that is read from, or associated with, a payment vehicle of the user, account data relating to banking accounts and user accounts maintained by a value-added service provider.

BRIEF DESCRIPTION OF THE DRAWINGS

Some embodiments will now be described, by way of non-limiting example only, with reference to the accompanying drawings in which.

DETAILED DESCRIPTION

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a computer effectively results in an apparatus that implements the steps of the preferred method.

In respect of the description provided herein, the terms "rewards points", "reward points", "program membership awards" and similar may be used but it will be understood that any such "entitlement" can be used interchangeably where those terms are recited.

Figure 1:
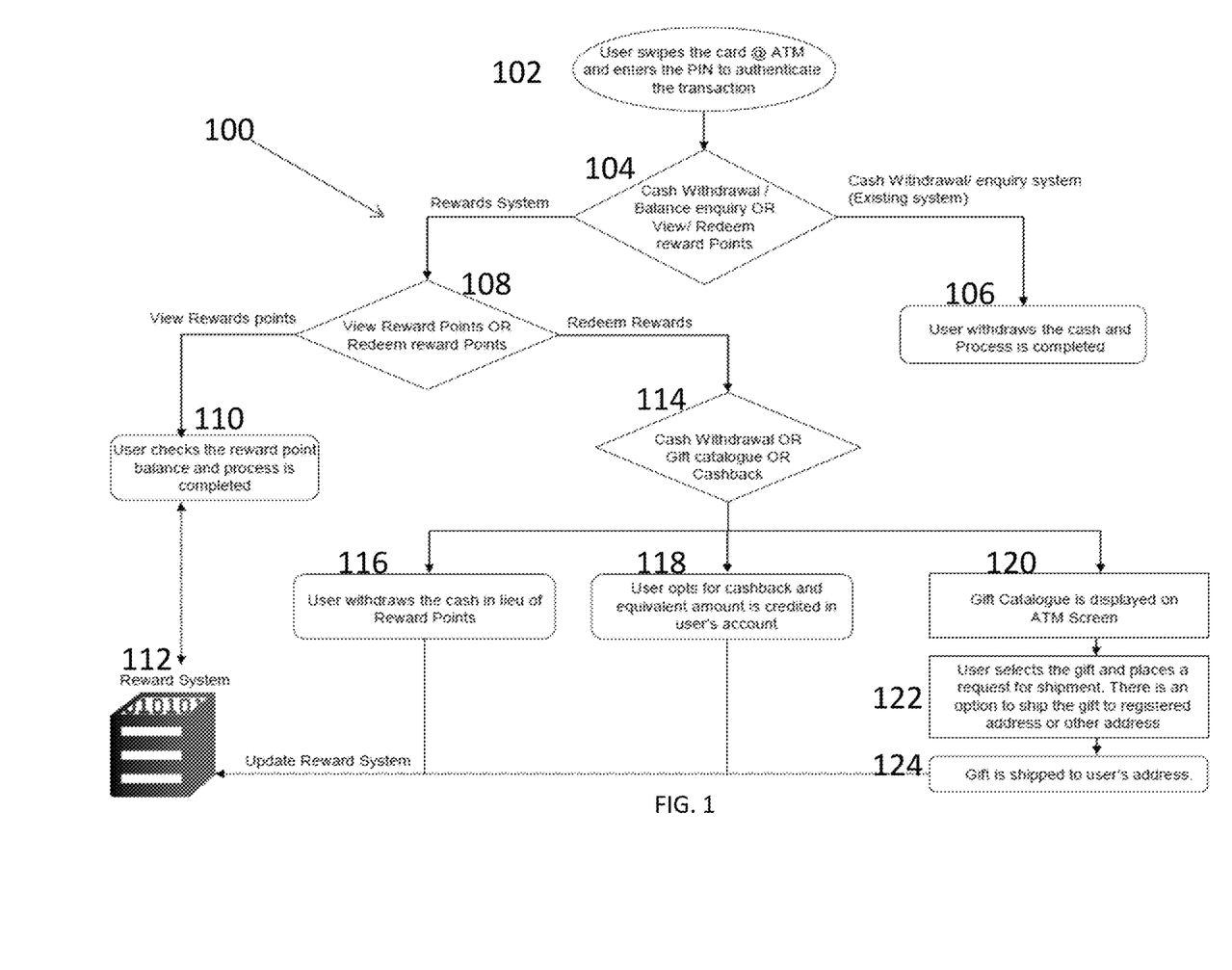
FIG. 1 is a flowchart illustrating methods for checking and using program membership awards at an ATM in accordance with an embodiment of the present invention.

FIG. 1 shows a flowchart 100 illustrating methods for checking and using program membership awards at an ATM.

In the traditional usage of ATMs a user swipes their card (102) and enters a PIN in order to verify that they are the holder of the card or otherwise authorised to use the card. If the correct PIN is entered, the ATM will display options to the user asking whether their usage of the ATM is for a balance enquiry or cash withdrawal (104). For a balance enquiry the balance of a particular account is displayed on a display of the ATM. For cash withdrawal the user then specifies an amount of cash to be withdrawn, the ATM either locally or via a separate (e.g. remote) processor of the banking system confirms the balance of the account is sufficient to fund the withdrawal—if so, the ATM dispenses that cash (106) and a relevant use account is debited by the withdrawal amount plus any ATM usage fees and other charges.

Figure 2:
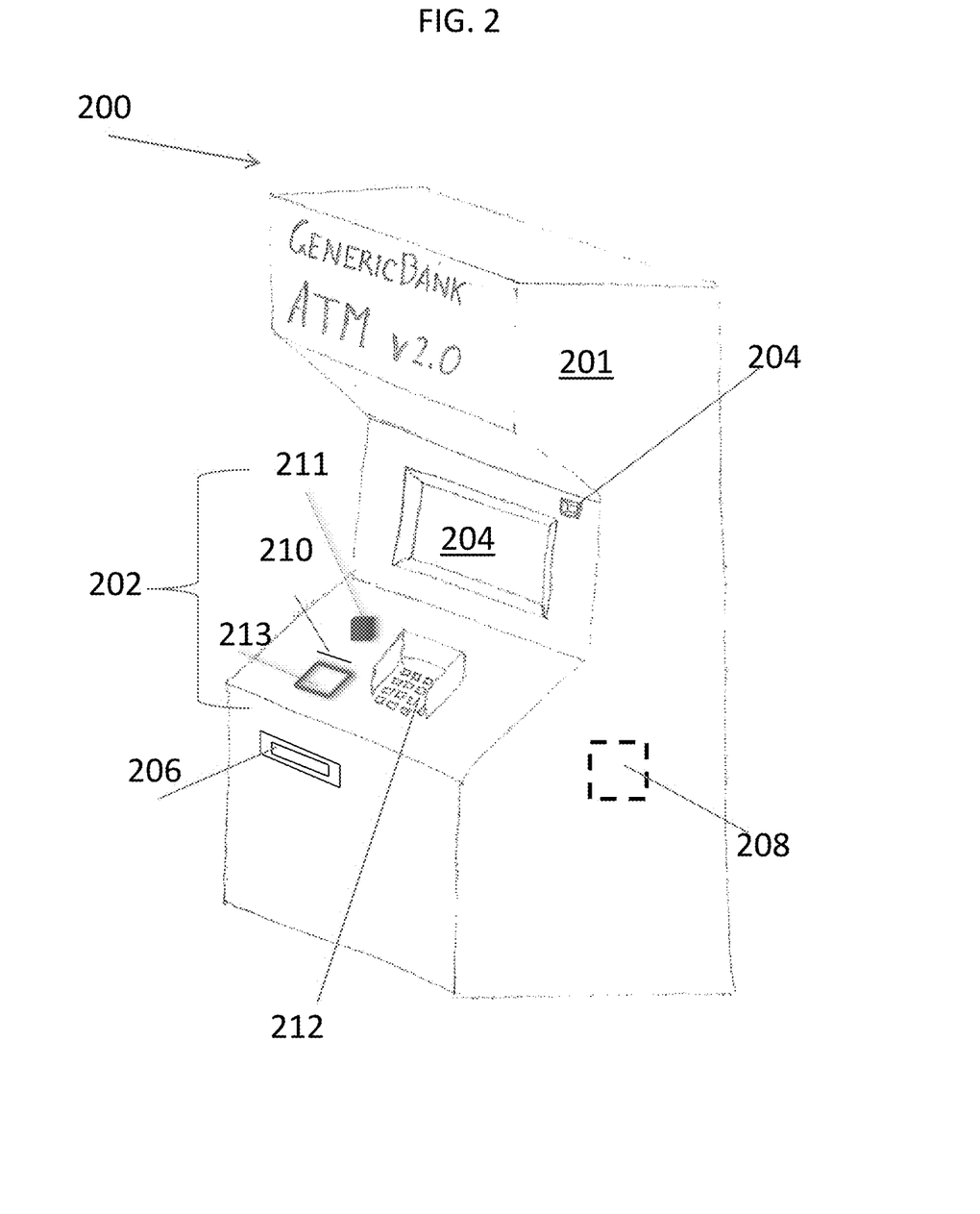
FIG. 2 illustrates an ATM implementing a process as set out in the flowchart of FIG. 1.

An ATM as shown in FIG. 2 may be configured to be capable of implementing processes as illustrated in the flowchart of FIG. 1 is also able to be used in non-traditional methods. One such method is for redeeming an entitlement, such as credit card rewards points, for cash at the ATM. Since the ATM comprises part of a banking system, that cash withdrawal can take place effectively immediately, from any relevant ATM, rather than the user having to be located in a particular merchant's store or a branch of a bank. This represents a significant time saving and improved convenience for the user.

If the user elects to perform operations relating to rewards points, the user will be prompted whether to view rewards points or redeem them (108). If the user elects to view rewards points, the rewards points balance is displayed (110) and the process completes.

In order for the rewards points balance to be displayed, the payment vehicle data is sent to a value-added services (e.g. loyalty awards services) provider. Alternatively, the payment vehicle data is matched by a banking system to other user data and that other user data is then sent to the value-added services provider. Whichever user data is sent to the value-added services provider, that data is then matched in a heretofore known manner to a user account held in a server (112) hosted by a value-added services provider, account data is retrieved from the user account and that account data is returned to the ATM.

That account data comprises one or more entitlements. Each entitlement represents an award to which the user is entitled. The award may be a sum of rewards or loyalty points, a particular award such as a milestone award, gift or bonus for establishing a new user account at a bank or making a minimum monthly spend or deposit associated with a user account, one or more items for which rewards or loyalty awards may be substituted and so forth.

If the user elects to redeem rewards points, options for redeeming are displayed to the user. The options may comprise an amount of cash for withdrawal, a gift catalogue or cashback (e.g. a deposit made into an account, such as a bank account, held by the user). Here, the flowchart provides three options 116, 118, 120 for redeeming rewards points. However, it will be appreciated that greater or fewer options may be provided as needed, without departing from the present teachings.

Under option 116, the user opts to exchange one or more rewards points for cash. The cash is then dispensed from the ATM as cash would normally be dispensed from an ATM. Advantageously, an ATM enabled to perform the present methods is, in effect, capable of exchanging cash equivalents (i.e. rewards points) for cash that is immediately dispensed without the need for a human-operated dispensary (e.g. bank branch teller, or merchant checkout employee). The server 112 is then sent rewards points transaction data (e.g. details on the number of rewards points redeemed and/or the amount of cash for which they were redeemed) and updates the user's account accordingly.

Under option 118, the user opts for cashback. The amount is then credited to a particular user account (e.g. a bank account associated with the user). Alternatively, the cash may be sent to a different account or may be used to offset bank or other charges. In the latter case, rewards points or a cashback may be used to pay for, for example, an annual credit card fee, account keeping fee or another fee. The server 112 is then sent rewards points transaction data (e.g. details on the number of rewards points redeemed and/or a description of that for which those points were redeemed) and updates the user's account accordingly.

Under option 120, the user is presented a gift catalogue comprising one or more items for which that can be acquired using rewards points—postage may, in some instances, be payable using rewards points and in other instances may be payable separately from the rewards points, using funds in the user's bank account. The items displayed in the gift catalogue may comprise all available items, or may comprise only those items that can be bought (i.e. through redemption of rewards points) by the points the user has thus far accumulated. Where the gift catalogue comprises all available items, each item may be listed with a number of reward points for which they can be obtained, and/or a number of reward points plus an amount of cash to replace the shortfall between the required number of reward points and the number of reward points currently held by the user. The user then selects an appropriate item from the one or more items (122), and the item is shipped to a specified address (124). The server 112 is then sent rewards points transaction data (e.g. details on the number of rewards points redeemed and/or a description of that for which those points were redeemed) and updates the user's account accordingly. Note: the term "gift catalogue" has been used, although it will be appreciated that the term is intended to refer to any catalogue of items, cash or non-cash, for which a user can redeem rewards points whether in full payment or part payment for the respective item.

The 'specified address' may be the postage or residential address reflected in the value-added service provider's records, the postage or residential address associated with a bank account of the user, or another address such as a business address or an address specified by the user through the ATM.

FIG. 2 shows an ATM 200 enabled to perform the methods identified in the flowchart of FIG. 1, including being capable of dispensing cash. The ATM 200 comprises a body generally designated 201. The body supports an interface 202 for receiving data, such as payment vehicle data, a communication module 208, and cash dispensing device presently in the form of a slot 206. The communication module is shown in broken lines as a result of it being internal to the body 201, although in some embodiments the communication module 208 may not be internal to the body 201.

The interface 202 is the part of the ATM 200 with which the user interacts to access the functions of the ATM 200, with the exception of physically drawing any dispensed cash from slot 206. The interface 202 includes a payment vehicle reader 204, 210, 211, 213 for reading payment vehicle data from a payment vehicle of a user, and an input device 212.

The payment vehicle reader can be any appropriate scanner, reader or image capture device, such as a credit card reader 210, debit card reader 210, finger-print scanner 211, near-field communication system (e.g. PayPass®, MasterPass®) 213 or quick response (QR) code or near field communication (NFC) reader 213. The payment vehicle reader may also comprise a camera or video camera, such as camera 204 of FIG. 2.

Where the payment vehicle scanner comprises a finger-print scanner 211, the payment vehicle may comprise the thumb or finger of the user (i.e. payment vehicle owner). Accordingly, the payment vehicle data may comprise a plurality of features of the fingerprint by which the user can be uniquely identified and thus uniquely associated with a banking account or other form of account. Similarly, where the payment vehicle scanner comprises a camera 204, the payment vehicle may be the face of a person and the payment vehicle data may comprise one or more features of the person, such that the number of features and/or their configuration is sufficient to uniquely identify the user.

The input device 212 may be a keypad, touch pad or other device by which additional information can be entered and thus received by the ATM. In some embodiments, the input device 212 may comprise part of a touch sensitive display and thus display 204 and input device 212 may comprise a single display.

The additional information received through the input device 212 is typically not found on the payment vehicle and can thus be used as an additional identifier to authenticate a user of the ATM or to locate or interact with particular functions of the ATM. For example, where the payment vehicle comprises a credit card, debit card, facial features or fingerprint features, the additional information may a personal identification number (PIN). The PIN is not knowable purely by having access to the payment vehicle. Thus the PIN can be cross-referenced against payment vehicle details, to ensure the former matches the latter, before permitting access to user account-related functions through the ATM. As mentioned above, such user account-related functions can include withdrawal of cash or account balance checking, but also the redemption of entitlements such as rewards points.

It will be appreciated that, in some instances, no additional identifier may be required to be entered.

The communication module may be any appropriate system component that is in communication with a processor in order to send user data to the processor. For example, where the user interface 202 receives payment vehicle information that is to be sent to a processor internal to the ATM, the communication module 208 may comprise a hardwired connection or data bus. Where that information is to be sent to a banking system, third party server or other system, the communication module 208 may again comprise a hardwired connection, or may be another form of connection such as a wireless LAN, wireless WAN, Ethernet or other network connection.

The communication module sends user data to the processor. In return for provision of the user data, the communication module receives account data of an account associated with the user. That account data is identifiable using the user data (e.g. using payment vehicle data comprising part, or the entirety of, the user data) and includes items such as one or more entitlements, each such entitlement being an award to which the user is entitled. Thus the communication module is a means by which the ATM can retrieve, either from its own databases or externally, information about entitlements so that the user may view that information on the ATM and/or may make a selection to redeem one or more of the entitlements.

To that end, the interface is also configured to receive selections of entitlements. Thus the ATM can be used to view and/or redeem entitlements. This is particularly advantageous for cash-based entitlements (i.e. entitlements that can be redeemed for, or are equivalent to, an amount of cash), since the ATM can immediately dispense that cash through slot 206.

Where the display is touch sensitive, entitlements may be selected or perused by touching the display. Other ATM functions relating to the viewing and redemption of entitlements may similarly be made through interaction with the touch sensitive display.

Figure 3:
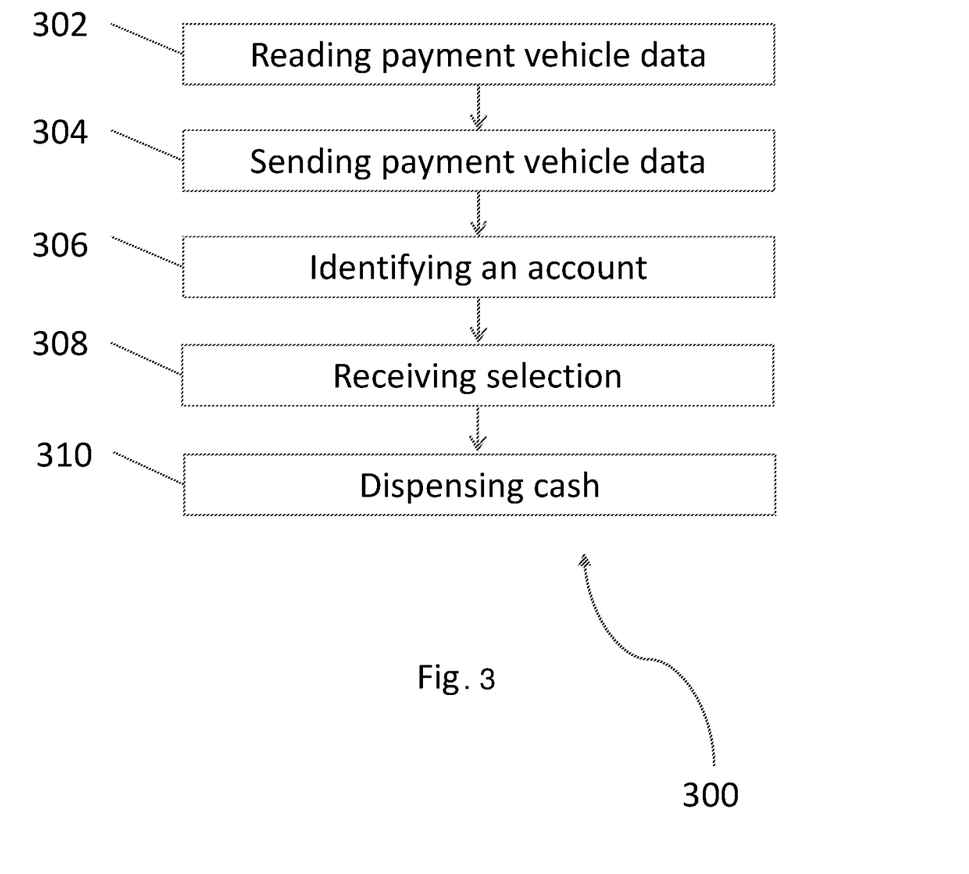
FIG. 3 depicts a method for redeeming membership awards at an ATM.

With reference to both FIG. 3, the method of redeeming rewards points, or another entitlement, for cash at an ATM is described in greater detail. Such a method 300 may include the steps of:

Step 302: reading payment vehicle data;
Step 304: sending payment vehicle data;
Step 306: identifying an account;
Step 308: receiving a selection of the amount of money; and
Step 310: dispensing cash.

Per Step 302, payment vehicle data is read from a payment vehicle using a payment vehicle reader of the ATM (102). The payment vehicle reader can be any appropriate scanner, reader or image capture device, such as a credit card reader, debit card reader, finger-print scanner, near-field communication system (e.g. PayPass®, MasterPass®) or quick response (QR) code reader. The payment vehicle reader may also comprise a camera or video camera, such as camera 204 of FIG. 2.

Where the payment vehicle scanner comprises a finger-print scanner, the payment vehicle may comprise the thumb or finger of the user (i.e. payment vehicle owner). Accordingly, the payment vehicle data may comprise a plurality of features of the fingerprint by which the user can be uniquely identified and thus associated with a banking account or other form of account. Similarly, where the payment vehicle scanner comprises a camera, the payment vehicle may be the face of a person and the payment vehicle data may comprise one or more features of the person, such that the number of features and/or their configuration is sufficient to uniquely identify the user.

After reading the payment vehicle data from the payment vehicle, that data is compared to stored user or user account data to authenticate the user accompanying the payment vehicle. Once the user is authenticated, options are displayed on a display 204 (see FIG. 2) for the user to select whether to use one of the traditional functions afforded by ATMs, such as checking a balance or withdrawing cash, or whether to use a function related to the entitlements of the user (104). In the present embodiment, the user has selected to view or redeem entitlements such as reward points (108).

Per Step 304, the payment vehicle data is sent to a processor of a value-added services system using communication module 208. The value-added services system may comprise a server system within a bank branch or office, or a hosted server system hosted by a third party provider. The payment vehicle data may alternatively be sent to a processor internal to the ATM. The processor may comprise part of a server hosted by a value-added services provider, such as a rewards or loyalty points service provider.

Where additional information, such as a PIN, is entered into the user interface 202, that additional information may also be sent with the payment vehicle details, to the processor.

The processor then receives the payment vehicle data and, using that data and any additional information sent with that data, identifies account data of a user account stored in the value-added services system. To do so, the processor matches the payment vehicle data, and any additional information, to credentials of a user account in any suitable manner.

The account data may also be identifiable using the payment vehicle data, as a result of interaction between a financial institution, such as a bank, and a third party operator, such as a value-added services provider. The user may authenticate themselves by providing payment vehicle details, and optionally some additional information, as set out with reference to FIG. 2. The payment vehicle data and any additional information may be used to identify a user bank account maintained by the financial institution. Bank account details associated with the user bank account, and/or payment vehicle data and any additional information, may then be provided to the value-added services provider's server system. The value-added services provider's server system then uses that information to locate the relevant user account from which account data can be obtained.

The account data comprises one or more entitlements. That data may also comprise additional information such as an expiry date associated with each entitlement, a particular vendor offering each entitlement, an estimate of the delivery date, an amount due for postage of each entitlement that comprises a particular physical item, and any other information relevant to entitlements that can accumulate in or against a user account.

Each entitlement represents an award to which the user is entitled. Such entitlements may include, but are not limited to, retail goods, vouchers and discount coupons. Relevantly, since the present methods are performed on an ATM, at least one entitlement can comprise entitlement to an amount of money. The amount of money may accumulate when, for example, a user opens a bank account, makes minimum monthly deposits into an account or a minimum monthly total of transactions from the account (based on units of currency), uses their credit card for the first time and so forth.

The user then selects an entitlement through the interface per step 308. Where the display 204 comprises a touch screen, selection may be made on that screen. Alternatively, selection may be made via keypad 212 or using another method such as a wink or facial expression where the camera 204 is used to capture such information. Where a selected entitlement comprises one or more of a selection of goods, those goods can be either automatically delivered to the user's address as listed with the value-added services provider, or with the financial institution associated with the payment vehicle, as entered via the user interface 202 or any other appropriate address.

Where a selected entitlement comprises an amount of money, the user can select that entitlement through the interface 202 of the ATM, and that money is then dispensed as cash from a dispensing device 206 of the ATM per step 310.

Figure 4:
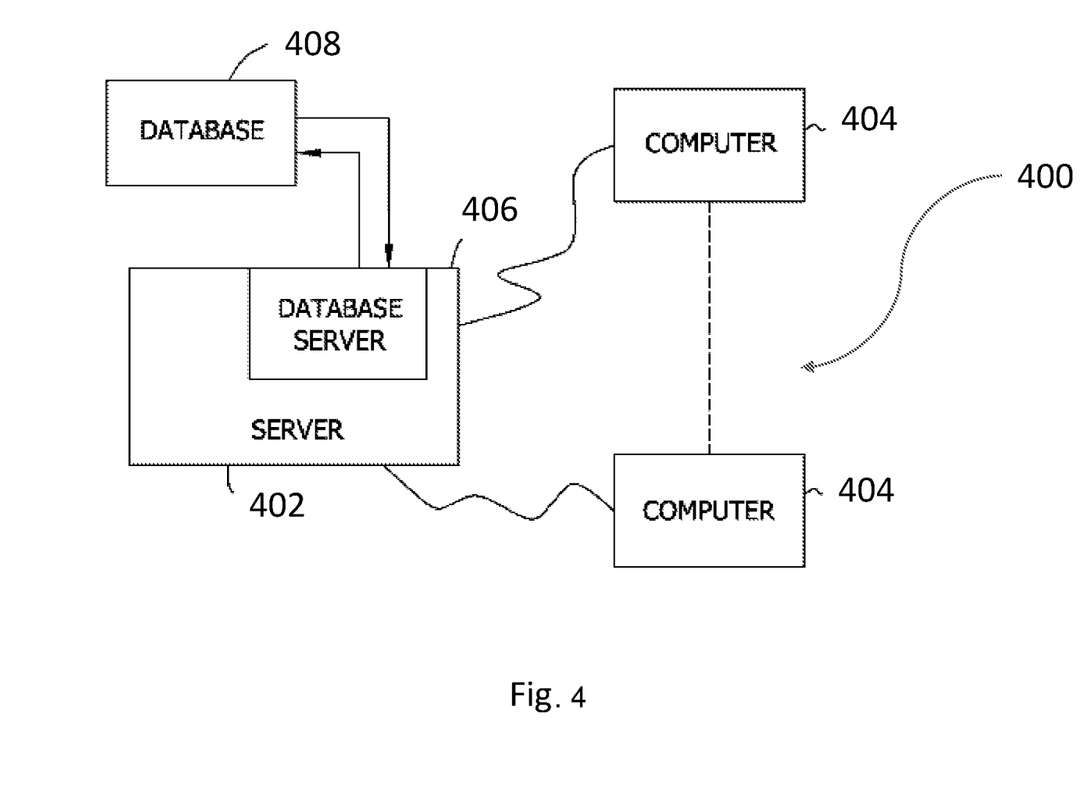
FIG. 4 is an expanded block diagram of an exemplary embodiment of a server architecture of a system comprising an ATM, for implementing the method of FIG. 3.

FIG. 4 is a simplified block diagram of an exemplary network-based system 400 used for viewing and/or redeeming an entitlement for cash at an automatic teller machine. System 400 is a client/server system that may be utilized for storage and delivery of data, such as user entitlements. More specifically, in the example embodiment, system 400 includes a server system 402, which may be managed by a bank or other financial institution, a value-added services provider or a third party. Server system 402 may also comprise a plurality of server systems including, for example, at least one server system of a financial institution such as a bank, and at least one value-added servicer server system. The system 400 also includes at least one client computer system 404, embodied in the present case by ATMs. Presently the system 400 includes a plurality of client sub-systems, also referred to as client computer systems, or ATMs 404, connected to server system 402. In one embodiment, client systems 404 are ATMs that include a web browser, such that server system 402 is accessible to client systems 404 using the Internet. This can enable the client systems 404 to access up-to-date versions of gift catalogues, product offerings, and entitlements on demand, as opposed to being only periodically updated. Client systems 404 may be interconnected to the Internet through a variety of interfaces including a network, such as a local area network (LAN) or a wide area network (WAN), dial-in-connections, cable modems and special high-speed ISDN lines. Where the server system 402 is incorporated into an ATM, the client systems 404 may comprise an external device that interacts directly with the ATM, such as a mobile phone communicating with the ATM through NFC.

A database server 406 is connected to database 408, which stores user accounts and/or user bank accounts, and account data such as entitlements associated with each relevant user account. In one embodiment, centralized database 408 is stored on server system 402 and can be accessed by potential users at one of client systems 404 by logging onto server system 402 through one of client systems 404. In an alternative embodiment, database 408 is stored remotely from server system 402 and may be non-centralized or decentralized. Database 408 may store electronic files, Electronic files may include user accounts and user account data, user bank accounts and user bank account data, gift catalogues, lists of coupons, discounts and other entitlements in any format suitable for storage in database 408 and for delivery using system 400.

The system 400 may actually be involved in collection of that data. For example, the system 400 may be interconnected with merchants, value-added services server systems and other information sources such that entitlements to which the user becomes entitled can be automatically collected by the system 400 and stored in database 408, and thereby become accessible to the user using the method set out in FIG. 3. For example, server system 602 could be in communication with an interchange network.

Similarly, database 408 may also store user account data including at least one of a cardholder name, a cardholder address, an account number, facial features (for facial recognition), fingerprint or thumbprint features (for recognition using scanner 213) and other account identifiers (e.g. a PIN). Database 408 may also store merchant data including a merchant identifier that identifies each merchant registered to offer entitlements, those merchants currently offering entitlements and/or whom are liable for delivery of current entitlements, and instructions for settling redemption actions (e.g. by posting an item, dispensing cash, and updating the entitlements of the user to reflect selection of an entitlement). Database 408 may also store information on past redemptions or selections of entitlements.

The database 408 may also be a non-transitory computer readable medium storing or embodying a computer program for redeeming an entitlement for, for example, cash at an automatic teller machine. The program may include at least one code segment executable by a computer to instruct the computer to perform a method as described herein, for example with reference to FIG. 3.

Figure 5:
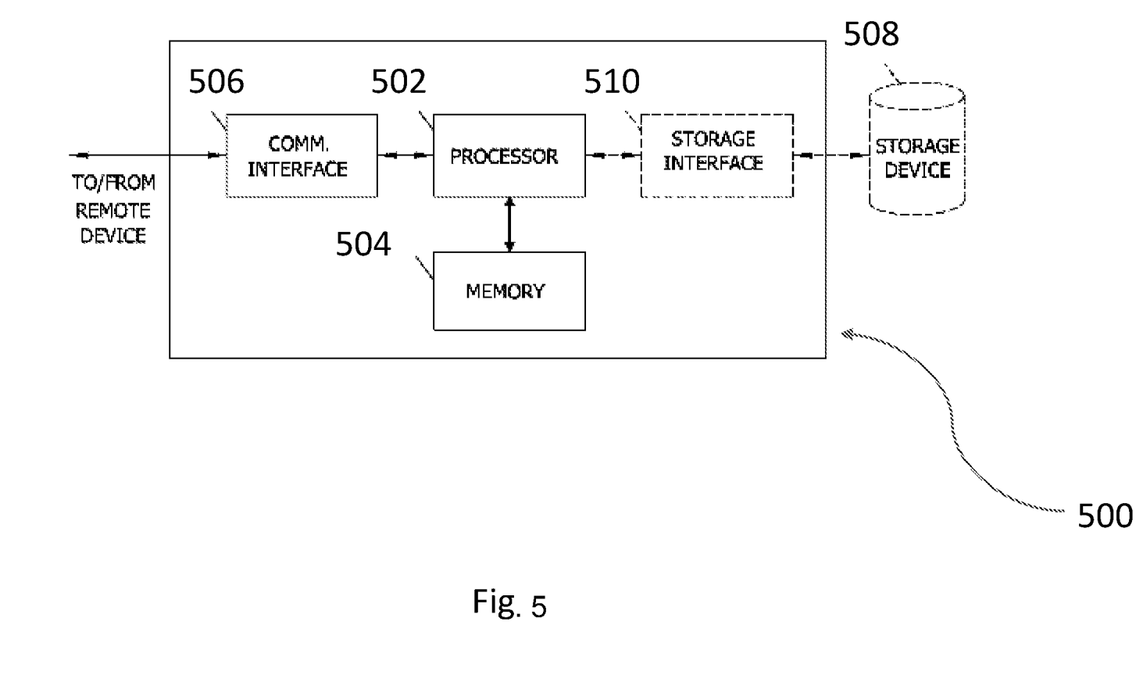
FIG. 5 illustrates an exemplary configuration of a server system shown in FIG. 4.

FIG. 5 illustrates an exemplary configuration of a computing device 500, similar to server system 400 (shown in FIG. 4). Computing device 500 may include, but is not limited to, database server, application server, web server, fax server, directory server, and mail server.

Server computing device 500 also includes a processor 502 for executing instructions. Instructions may be stored, for example, in a memory area 504 or other computer-readable media. Processor 502 may include one or more processing units (e.g., in a multi-core configuration).

Processor 502 may be operatively coupled to a communication interface 506 such that server computing device 500 is capable of communicating with a remote device such as user computing device or ATM 404 (shown in FIG. 4) or another server computing device 500. For example, communication interface 506 may receive requests from an ATM 404 via the Internet.

Processor 502 may also be operatively coupled to storage device 508. Storage device 508 is any computer-operated hardware suitable for storing and/or retrieving data. In some embodiments, storage device 508 is integrated in server computing device 500. For example, server computing device 508 may include one or more hard disk drives as storage device 508. In other embodiments, storage device 508 is external to server computing device 500 and may be accessed by a plurality of server computing devices 500. For example, storage device 508 may include multiple storage units such as hard disks or solid state disks in a redundant array of inexpensive disks (RAID) configuration. Storage device 508 may include a storage area network (SAN) and/or a network attached storage (NAS) system.

In some embodiments, processor 500 is operatively coupled to storage device 508 via a storage interface 510. Storage interface 510 is any component capable of providing processor 502 with access to storage device 508. Storage interface 510 may include, for example, an Advanced Technology Attachment (ATA) adapter, a Serial ATA (SATA)

adapter, a Small Computer System Interface (SCSI) adapter, a RAID controller, a SAN adapter, a network adapter, and/or any component providing processor 502 with access to storage device 508.

In operation, the processor 502, coupled to a memory device (including memory device 504 and storage device 508), is configured to execute computer program steps to implement a method for redeeming an entitlement for cash at an automatic teller machine (ATM). The computer program steps may include steps executable to cause the processor to read payment vehicle data from a payment vehicle using a payment vehicle reader of the ATM, and send the payment vehicle data to a processor of a value-added services server system. The processor may further be configured by the computer program steps such that, once the payment vehicle data is sent, that data is used to identify account data of a user account stored in the value-added services server system, the account data comprising one or more entitlements, each entitlement representing an award to which the user is entitled and wherein at least one entitlement comprises entitlement to an amount of money. The one or more entitlements may then be displayed to a user. The processor is also configured by the computer program steps to receive a selection of the amount of money through an interface of the ATM, and dispense the amount of money as cash from a dispensing device of the ATM.

The computer system 500 may be instructed to perform a method for redeeming an entitlement at an automatic teller machine (ATM) by a computer program embodied on a non-transitory computer readable medium, such as memory device 408 or storage device 508. The program stored on the device 408, 508 would include at least one code segment, and most likely many thousands of code segments, executable by a computer to instruct the computer to perform the requested operations.

Similarly, the program may be stored remotely. To this end, the computer system may constitute a client computer system of a network-based system for redeeming an entitlement for cash at an automatic teller machine (ATM).

Many modifications and variations of the present teachings will be apparent to the skilled person in light of the present disclosure. All such modifications and variations are intended to fall within the scope of the present disclosure. Moreover, to the extent possible, features form one of the embodiments described herein may be used in one or more other embodiments to enhance or replace a feature of the one or more other embodiments. All such usage, substitution and replacement is intended to fall within the scope of the present disclosure.

The invention claimed is:

1. A machine for redeeming an entitlement, comprising:
  an interface for receiving user data, the user data comprising payment vehicle data, the interface comprising:
    a payment vehicle reader for reading the payment vehicle data from a payment vehicle of a user; and
    an input device for receiving an input of at least one additional identifier, the user data comprising the at least one additional identifier if the at least one additional identifier is inputted;
  a communication module in communication with a processor, for sending the user data to the processor and receiving, from the processor, account data of an account associated with the user, the account being identifiable using the user data, the account data comprising one or more entitlements, each entitlement representing an award to which the user is entitled;
  a touch sensitive display displaying a gift catalogue comprising items for selection associated with the one or more entitlements that can be acquired only using rewards points the user has accumulated and displaying at least one selection for an amount of cash; and
  a cash dispensing device for dispensing cash in the event that the user selects via the touch sensitive display an amount of cash.

2. A machine according to claim 1, wherein at least one entitlement comprises an item the selection of which requires the user to provide part payment for the item, and wherein the interface is configured to receive authorization to make the part payment from a banking account associated with the user.

3. A machine according to claim 2, wherein the banking account is associated with the payment vehicle.

4. A machine according to claim 1, wherein the payment vehicle reader comprises a camera.

5. A machine according to claim 4, wherein the camera captures an image of the face of a user of the machine, the machine further comprising an image processor for identifying features in the image and determining whether those features correspond to stored features of an image of a user.

6. A method for redeeming an entitlement for cash at an automatic teller machine (ATM), the method comprising:
  reading payment vehicle data from a payment vehicle using a payment vehicle reader of the ATM;
  sending the payment vehicle data to a processor of a value-added services server system;
  identifying, using the payment vehicle data, account data of a user account stored in the value-added services server system, the account data comprising one or more entitlements, each entitlement representing an award to which the user is entitled and wherein at least one entitlement comprises entitlement to an amount of cash;
  displaying a gift catalogue on a touch sensitive display comprising items for selection associated with one or more entitlements that can be acquired only using rewards points the user has accumulated and at least one selection for an amount of cash;
  receiving a selection of an amount of cash via the touch sensitive display and through an interface of the ATM; and
  dispensing the amount of cash from a dispensing device of the ATM.

7. A network comprising:
  at least one server system of a banking corporation;
  at least one value-added services server system; and
  at least one automatic teller machine (ATM) in electronic communication with at least one of the server system of a banking corporation and the at least one value-added services server system, the ATM comprising a touch sensitive display and being configured to:
    authenticate a user with reference to user data held by the at least one server system of the banking corporation;
    provide information to the at least one value-added services server system;
    receive, from the at least one value-added services server system, account data of a user account held in the at least one value-added services server system, the account data comprising one or more entitlements to which the user is entitled;
    display a gift catalogue on a touch sensitive display comprising items for selection associated with one or more entitlements that can be acquired only using rewards points the user has accumulated and at least one selection for an amount of cash;
receive a selection of an amount of cash via the touch sensitive display; and
dispense an amount of cash in response to the selection.

* * * * *